United States Patent
Kim et al.

(10) Patent No.: US 8,285,045 B2
(45) Date of Patent: Oct. 9, 2012

(54) IMAGE ANALYSIS METHOD, MEDIUM AND APPARATUS AND MOVING IMAGE SEGMENTATION SYSTEM

(75) Inventors: Jun-mo Kim, Seoul (KR); Young-su Moon, Seoul (KR); Yong-seok Yoo, Seoul (KR); Yoon-kyung Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1261 days.

(21) Appl. No.: 11/898,780

(22) Filed: Sep. 14, 2007

(65) Prior Publication Data

US 2008/0095436 A1    Apr. 24, 2008

(30) Foreign Application Priority Data

Oct. 18, 2006    (KR) .................. 10-2006-0101571

(51) Int. Cl.
*G06K 9/34* (2006.01)
(52) U.S. Cl. ....................................... 382/173
(58) Field of Classification Search .............. 382/103, 382/106, 107, 154, 162, 164, 170–173, 285; 348/152, 154, 169, 625; 358/2.1, 537
See application file for complete search history.

(56) References Cited

U.S. PATENT DOCUMENTS

| | | | |
|---|---|---|---|
| 5,557,684 | A | 9/1996 | Wang et al. |
| 5,790,086 | A | 8/1998 | Zelitt |
| 6,157,733 | A | 12/2000 | Swain |
| 6,252,982 | B1 | 6/2001 | Haisma et al. |
| 6,903,782 | B2 * | 6/2005 | Herman et al. ............ 348/625 |

OTHER PUBLICATIONS

Yoon et al., "Moving Object Segmentation with Accurate Boundary Using Color and Motion", Department of Electrical Engineering, KAIST, 6 pgs (in English), Published on 2000.
Korean Office Action for corresponding Korean Patent Application No. 10-2006-0101571 dated Nov. 27, 2008.
Elgammal et al., "Non-parametric Model for Background Subtraction", Computer Vision Laboratory, Springer-Verlag Berlin Heidelberg 2000, pp. 751-767 (in English).
Wang et al., "Representing Moving Images with Layers", IEEE Transactions on Image Processing, vol. 3, No. 5, pp. 625-638, Sep. 1994 (in English).
Kolmogorov et al., "Bi-Layer segmentation of binocular stereo video", Microsoft Research Ltd., 8 pages (in English), Published on 2005.
Philip Hilaire Sean Torr, "Motion Segmentation and Outlier Detection, Department of Engineering Science University of Oxford", Hilary Term, 1995, 9 unnumbered pages and pp. 1-248 (in English).
U.S. Appl. No. 11/898,205, filed Sep. 10, 2007, Jun-mo Kim et al., Samsung Electronics Co., Ltd.

(Continued)

*Primary Examiner* — Duy M Dang
(74) *Attorney, Agent, or Firm* — Staas & Halsey LLP (57) ABSTRACT

An image analysis method, medium and apparatus for segmentation of a moving image, and a moving image segmentation system. The image analysis method includes receiving an image signal representing an image, detecting features of the image by calculating a difference between the current frame of the image signal and its previous frame, analyzing the image signal based on the detected features of the image, and performing segmentation on the image signal according to the analysis result, thereby separately performing segmentation on all types of moving images. In other words, by using an appropriate segmentation method according to a feature of an image, effective segmentation can be achieved.

20 Claims, 7 Drawing Sheets

OTHER PUBLICATIONS

Office Action mailed Aug. 17, 2011 in copending U.S. Appl. No. 11/898,205.

Office Action mailed Apr. 26, 2011 in copending U.S. Appl. No. 11/898,205.

"Multiple View Geometry in Computer Vision," Hartley et al., Cambridge University Press (2003) (five pages, numbered 239-241 and 287-288) (supplements reference AG submitted in the Information Disclosure Statement filed on May 14, 2012 as "Epipolar Geometry and the Fundamental Matrix" (five pages)).

"Multiple View Geometry in Computer Vision," Hartley et al., Cambridge University Press (2003) (two pages, numbered 434-435) (supplements reference AS submitted in the Information Disclosure Statement filed on May 14, 2012 as "N-View Computational Methods" (pp. 434-435)).

"Occlusion edge blur: A cue to retative visual depth," Marshall et al., Journal of the Optical Society of America, Apr. 1996 (pp. 1-14).

Notice of Allowance mailed Feb. 7, 2012 in co-pending U.S. Appl. No. 11/898,205.

"Automatic Segmentation of Moving Objects for Video Object Plane Generation," Meier et al., IEEE Transactions on Circuits and Systems for Video Technology, vol. 8, No. 5, Sep. 1998 (pp. 525-538).

"Epipolar Geometry and the Fundamental Matrix" (five pages).

"The Dip Test of Unimodality," J. A. Hartigen-et al., The Annals of Statistics, vol. 13, Issue 1, Mar. 1985 (pales 70-84).

"Using Kernel Density Estimates to Investigate Multimodality," B.W. Silverman, Journal of the Royal Statistical Society. Series B (Methodological), vol. 43, No. 1, 1981 (pp. 97-99).

"Outlier Detection and Motion Segmentation," P.H.S. Torr et al., Robotics Research Group, Department of Engineering Science, University of Oxford (twelve pages).

"Segmentation of Moving Objects in Image Sequence: A Review," Dengsheng Zhang et al., Circuits Systems Signal Processing vol. 20, No. 2, 2001 (pp. 143-183).

"Bilayer Segmentation of Live Video," A. Criminisi et al., Microsoft Research Ltd., Cambridge, CB3 0FB, United Kingdom, (pp. 1-8) http://research.microsoft.com/vision/cambridge/i2i.

"Contour and Texture Analysis for Image Segmentation," Jitendra Malik et al., International Journal of Computer Vision 43(1), Jul. 27, 2001 (pp. 7-27).

"Normalized Cuts and Image Segmentation," Jianbo Shi et al., IEEE Transactions on Pattern Analysis and Machine Intelligence, vol. 22, No. 8 Aug. 2000 (pages 888-905).

"Active Contours Without Edges," Tony F. Chan et al., IEEE Transactions on Image Processing, vol. 10, No. 2 Feb. 2001 (pp. 266-277).

"Optimal Approximitions by Piecewise Smooth Functions and Associated Variational Problems," David Mumford et al., Communications on Pure and Applied Mathematics, vol. XLII, 1989, (pp. 577-685).

"Rapid Object Detection using a Boosted Cascade of Simple Features," Paul Viola et al., IEEE, 2001 (pp. 511-518).

"Recovering Human Body Configurations using Pairwise Constraints between Parts," Xiaofeng Ren et al., Computer Science Division, University of California, Berkeley, CA 94720 (pp. 1-8).

"N-View Computational Methods" (pp. 434-435).

Notice of Allowance mailed May 24, 2012 in co-pending U.S. Appl. No. 11/898,205.

* cited by examiner

IMAGE ANALYSIS METHOD, MEDIUM AND APPARATUS AND MOVING IMAGE SEGMENTATION SYSTEM

CROSS-REFERENCE TO RELATED APPLICATIONS

This application claims the benefit of Korean Patent Application No. 10-2006-0101571, filed on Oct. 18, 2006, in the Korean Intellectual Property Office, the disclosure of which is incorporated herein in its entirety by reference.

BACKGROUND

1. Field

One or more embodiments of the present invention relate to image processing, and more particularly, to an image analysis method and apparatus for moving image segmentation.

2. Description of the Related Art

Research on segmentation associated with digital video signal processing has steadily attracted attention. The field of segmentation has become an essential part of various multimedia applications and new techniques are being applied for effective analysis and representation.

Video signal segmentation has applications in various fields and the segmentation result can be effectively used in display quality processing, video encoding, and object recognition. For example, in the field of display quality processing, if a foreground and a background in a video can be segmented from each other, a three-dimensional effect/realness can be improved by separately processing the foreground and the background. The foreground is important and may be in the center portion of a video screen. The foreground may include objects in good focus or near a camera, e.g., a key person or object in the screen. The background is the remaining part of the screen excluding the foreground and may be of lesser importance or no interest, such as a background image, a mountain, a tree, or a building.

In the field of video encoding, video encoding compression efficiency can be improved using video segmentation like in moving picture experts group (MPEG)-4, for example. To this end, an analog video signal input through an imaging medium such as a video camera may be converted into a digital video signal, segmentation may be performed to distinguish a foreground object area from a background area, and separate compression encodings may be performed on the background area and the foreground object area based on the segmentation result.

In the field of object recognition, in order to recognize a main object in a video, a foreground area in which the main object exists should be first detected from the video.

As mentioned above, video segmentation is required as precedent technology for various application fields and thus various precedent techniques have been disclosed. The following are representatives of precedent studies in the field of video segmentation.

First, "Non-Parametric Model for Background Subtraction" by Ahmed Elgammal, et al. (Lecture Notes in Computer Science, Volume 1843, ECCV 2000, pp. 751-767) describes a segmentation method using background subtraction. However, although background subtraction may be fast and simple, it can typically only be applied to a video taken by a still camera, i.e., only when a camera is in a still state.

A patent version of the literature "Representing Moving Images with Layers" by J. Y. A. Wang, et al. (IEEE Trans. Image Processing, vol. 3, pp. 625-638, September 1994), i.e., U.S. Pat. No. 5,557,684 entitled "System for Encoding Image Data into Multiple Layers Representing Regions of Coherent Motion and Associated Motion Parameters" describes a segmentation method using 2-dimensional (2D) motion estimation in which 2D motion is estimated and segmentation is performed based on the motion estimation result. However, motion estimation and segmentation should to be performed repetitively because 2D motion estimation may not be accurate until segmentation is performed. Moreover, 2D motion estimation may be applicable only on the assumption that an object in a video is piecewise planar.

"Motion Segmentation and Outlier Detection" by P. H. S. Torr (Ph.D. thesis, Univ. of Oxford, 1995) describes a segmentation method that first estimates 3D motion of main feature points such as corner points and segment those feature points into a foreground and a background based on their 3D motions. This segmentation method is a relatively accurate technique compared to those based on 2D motion analysis, but it may have low processing speed due to the large amount of computation required.

"Bi-Layer Segmentation of Binocular Stereo Video" by V. Kolmogorov, et al. (Proc. IEEE Computer Vision and Pattern Recognition (CVPR), vol. 2, pp. 407-414, 2005) describes a segmentation method based on the fact that a distance between each pixel and a camera provides importation information for segmentation. However, the disclosed segmentation method may not be applicable to general video, i.e., a video taken by a mono camera, since it involves calculating a depth from two videos taken by a stereo camera.

As mentioned above, much research on video segmentation has been conducted over the past years and extensive precedent studies are being carried out on video segmentation. However, a segmentation method for effectively performing segmentation according to the features of various videos has not yet been suggested and conventional segmentation techniques have strong points and weak points in terms of the range of video to which they can be applied, accuracy, and processing speed.

SUMMARY

One or more embodiments of the present invention provide an image analysis method for segmentation, in which one of many applicable segmentation methods having high accuracy and processing speed, is selectively used according to the feature of an image, particularly, according to whether a camera may move and whether a foreground object moving independently of a background may exist in the image, thereby improving accuracy and processing speed.

One or more embodiments of the present invention also provide an image analysis apparatus for segmentation, in which one of many applicable segmentation methods having high accuracy and processing speed, is selectively used according to the feature of an image, particularly, according to whether a camera may move and whether a foreground object moving independently of a background may exist in the image, thereby improving accuracy and processing speed.

One or more embodiments of the present invention also provide a video segmentation system using the image analysis apparatus.

Additional aspects and/or advantages of the invention will be set forth in part in the description which follows and, in part, will be apparent from the description, or may be learned by practice of the invention.

To achieve at least the above and/or other aspects and advantages, embodiments of the present invention include an image analysis method for an image signal representing an image. The method includes detecting a feature of the image, determining a segmentation algorithm based on the detected feature of the image, and segmenting the image signal using the determined segmentation algorithm.

To achieve at least the above and/or other aspects and advantages, embodiments of the present invention include an image analysis method. The method includes receiving an image signal representing an image and calculating a difference between two consecutive frames of the image signal, detecting motion of a camera taking the image based on the calculated difference, tracking feature points of the image and comparing the feature points with motion of the camera in order to determine a quantity of outliers that are not associated with the motion of the camera, analyzing the image signal based on the motion of the camera and the number of outliers, and performing segmentation with respect to the image signal according to the analysis result.

To achieve at least the above and/or other aspects and advantages, embodiments of the present invention include an image analysis method for an image signal provided by a moving image recording device. The method includes detecting features of the image signal, determining features of the image signal including whether one or more of the image and a camera taking the image have motion, and, segmenting the image signal into a foreground region and a background region using a predetermined segmentation algorithm selected according to the detected features of the image signal.

To achieve at least the above and/or other aspects and advantages, embodiments of the present invention include an image analysis apparatus for an image signal representing an image. The apparatus includes a feature detection unit to detect a feature of the image, and an image analysis unit to determine a segmentation algorithm based on the detected feature of the image, and an image segmentation unit to segment the image signal using the segmentation algorithm determined by the image analysis unit.

To achieve at least the above and/or other aspects and advantages, embodiments of the present invention include a moving image segmentation system to segment an image signal received from the image signal input apparatus into a foreground region and a background region. The system includes an image signal input apparatus and an image analysis apparatus.

To achieve at least the above and/or other aspects and advantages, embodiments of the present invention include a moving image segmentation system to segment an image signal input received the image signal input apparatus into a foreground region and a background region. The system includes an image signal input apparatus, and an image mode classifying apparatus to classify the image signal into an image mode suitable for segmentation of the image signal based on the feature of the image signal received from the image signal input apparatus and to output the image signal to a segmentation apparatus corresponding to the mode into which the image signal is classified.

To achieve at least the above and/or other aspects and advantages, embodiments of the present invention include a system analyzing an image signal provided by a moving image recording device. The system includes a feature detection unit to detect features of the image signal including whether one or more of the image and a camera taking the image have motion, and an image segmentation unit to segment the image signal into a foreground region and a background region using a predetermined segmentation algorithm selected according to the detected features of the image signal.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF EMBODIMENTS

Reference will now be made in detail to embodiments of the present invention, examples of which are illustrated in the accompanying drawings, wherein like reference numerals refer to the like elements throughout. Embodiments are described below to explain the present invention by referring to the figures.

Figure 1:
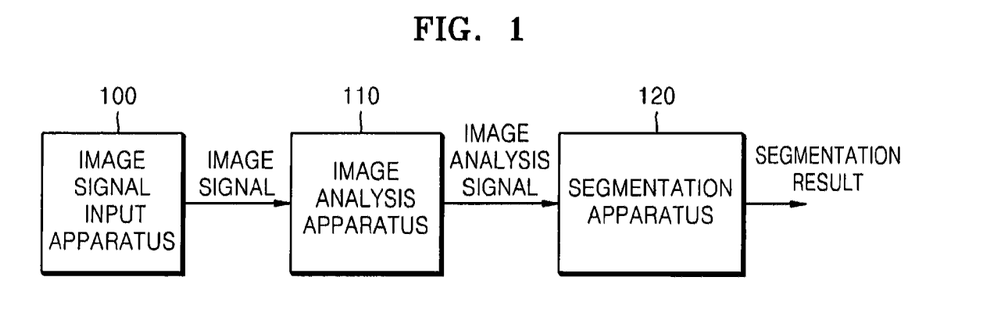
FIG. 1 illustrates a moving image segmentation system, according to an embodiment of the present invention.

FIG. 1 illustrates a moving image segmentation system, according to an embodiment of the present invention.

Referring to FIG. 1, the moving image segmentation system may include, for example, an image signal input apparatus 100, an image analysis apparatus 110, and a segmentation apparatus 120.

The image signal input apparatus 100 may input an image taken by a moving image recording device, such as a video camera, a digital camera, or a camera phone. Images types may include, for example, a TV broadcasting image, a personal content image, or a stored media play image. Here, the image may be an analog image or a digital image, but it is assumed for a current embodiment that the input image is a digital image. Image sequences converted into a digital image signal may be sequentially input to the image analysis apparatus 110, according to an embodiment of the present invention. The image analysis apparatus 110 may analyze the image signal received from the image signal input apparatus 100 based on features of the image signal. Such features may include, for example, whether the image has motion, whether a camera taking the image moves, or whether a foreground object that moves independently in the image exists. As a result of the analysis, the image analysis apparatus 110 may provide an image analysis signal to the segmentation apparatus 120. Optionally, the image analysis apparatus 110 may include the segmentation apparatus 120.

The segmentation apparatus 120 may receive the image analysis signal from the image analysis apparatus 110 and segment the image signal into a foreground region and a background region according to the received image analysis signal. In an embodiment of the present invention, the image analysis signal may indicate one of mode [1] through mode

[6]. The segmentation apparatus 120 may perform segmentation algorithms suitable for mode [1] through mode [6] to segment an image into a foreground region and a background region.

A criterion for classifying the image into one of the 6 image modes indicated by the image analysis signal may be based on, for example, whether a camera moves and a moving foreground object exists. In mode [1], a camera is in a still state and a foreground object does not exist. In mode [2], a camera is in a still state and a foreground object exists, but is in a still state. In mode [3], a camera is in a still state and a foreground object exists and moves independently. In mode [4], a camera moves and a foreground object does not exist. In mode [5], a camera moves and a foreground object exists, but is in a still state. In mode [6], a camera moves and a foreground object exists and moves independently.

Although an image is classified into one of 6 modes to explain embodiments of the present invention, the scope of the present invention is not limited to such classification, and additional or different modes are equally applicable.

The input image signal may be analyzed according to its features and segmentation may be performed in an appropriate image mode using a segmentation algorithm suitable for each image mode.

For example, since there is no foreground object in mode [1] and mode [4], segmentation into a foreground region and a background region may not be required. Since a camera is in a still state and a foreground object exists in a still state in mode [2], the entire image is in a still state. Thus, a still image object segmentation method may be useful for mode [2]. Since a camera is in a still state and a foreground object moves independently in mode [3], the still image segmentation method may not be applicable to mode [3]. However, since an image is taken by a still camera, a background does not move and only a foreground object moves. Therefore, the foreground region and the background region may be effectively segmented from each other using, for example, a background subtraction method.

Since a camera moves and a foreground object does not exist in mode [4], segmentation may not be required. In mode [5], a camera moves and a foreground object and background are in a still state. Therefore, a depth estimation method using extraction of a 3D structure from motion of the camera may be applied to mode [5]. Thus, segmentation may be performed using depth information obtained by depth estimation. Since a camera moves and a foreground object moves independently in mode [6], unlike in mode [5], depth estimation is not applicable. Thus, a segmentation method using 3D motion may be suitable for mode [6].

A detailed description of the segmentation methods used for the image modes will not be provided, as they are generally known. Instead, segmentation methods suitable for the image modes will be introduced briefly with reference to the figures.

Figure 2:
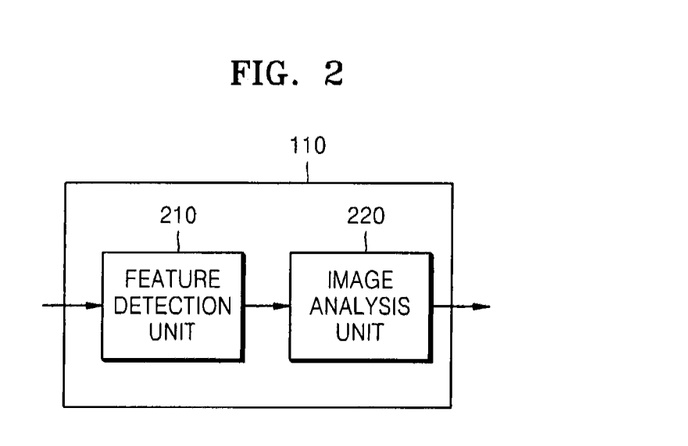
FIG. 2 illustrates an image analysis apparatus illustrated in FIG. 1, according to an embodiment of the present invention.

FIG. 2 illustrates an image analysis apparatus 110, such as of FIG. 1.

Referring to FIG. 2, the image analysis apparatus 110 may include, for example, a feature detection unit 210 and an image analysis unit 220.

The feature detection unit 210 may receive the image signal from the image signal input apparatus 100 and detect the features of the image signal. The image signal may be generated by a camera taking the image, and in an embodiment of the present invention, the features of the image signal may include information about whether the image has motion or whether a camera moves, for example. This feature information may indicate whether a camera taking the image is in a still state or on the move, and whether a foreground object moving independently of a background exists in the image.

The image analysis unit 220 may analyze the detected feature information of the image signal to classify the image signal as an appropriate image mode and provide the resulting image analysis signal to the segmentation apparatus 120 illustrated in FIG. 1. The segmentation apparatus 120 may perform segmentation in an image mode in which a segmentation apparatus suitable for the image analysis signal, i.e., the features of the image, may be selected. The feature detection unit 210 will be described in more detail with reference to FIG. 3.

Figure 3:
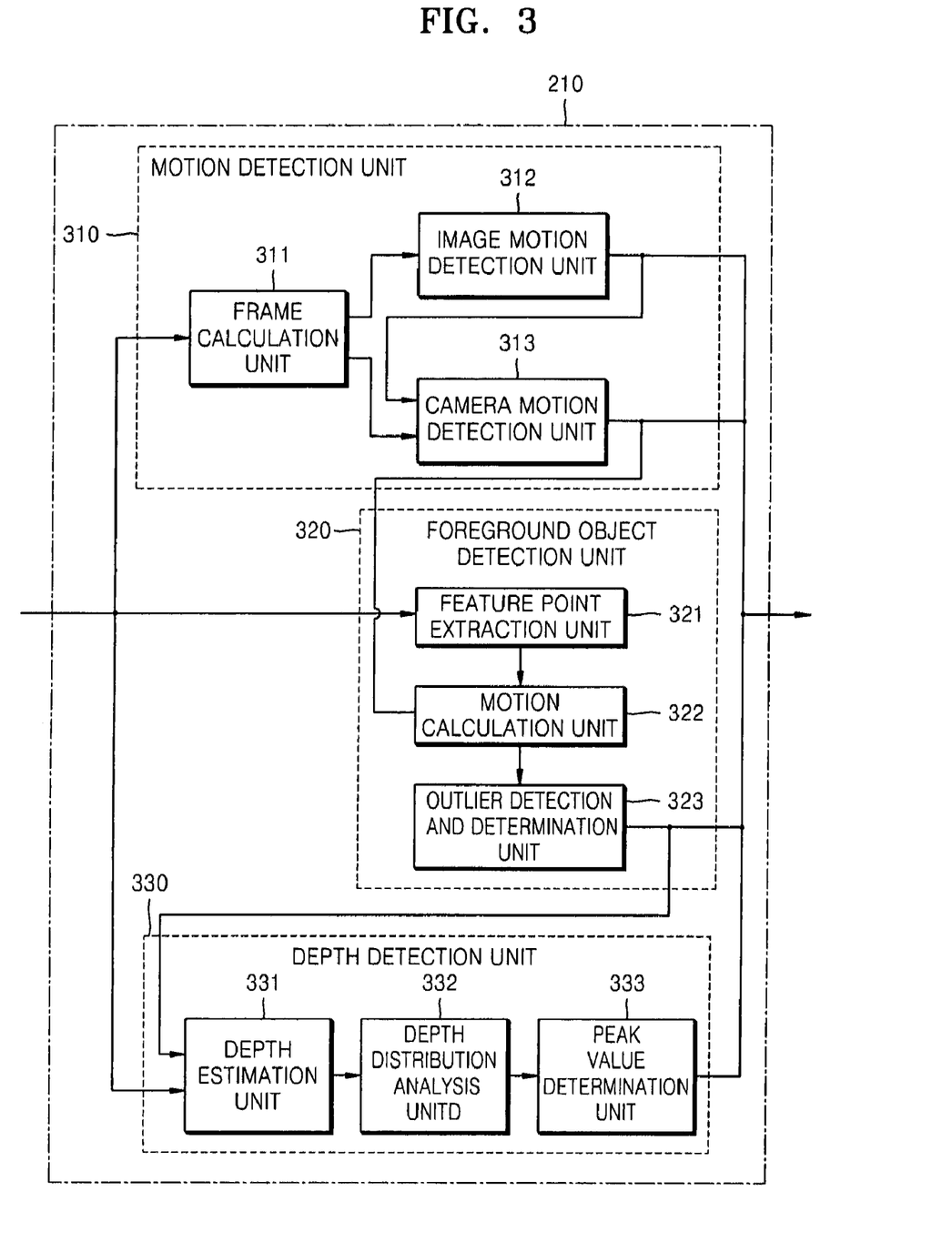
FIG. 3 illustrates a feature detection unit illustrated in FIG. 2, according to an embodiment of the present invention.

FIG. 3 is a schematic block diagram of the feature detection unit 210 illustrated in FIG. 2.

Referring to FIG. 3, the feature detection unit 210 may include, for example, a motion detection unit 310, a foreground object detection unit 320, and a depth detection unit 330. Optionally, a scene change detection unit (not shown) may be further included.

The motion detection unit 310 may detect motion of an image and motion of a camera taking the image. To this end, the motion detection unit 310 may include, for example, a frame calculation unit 311, an image motion detection unit 312, and a camera motion detection unit 313.

The frame calculation unit 311 may receive the image signal from the image input apparatus 100 and may calculate a difference between a current frame and a previous frame, e.g., consecutive frames, of the image signal. The image motion detection unit 312 may detect motion of the image based on difference information received from the frame calculation unit 311. The camera motion detection unit 313 may detect motion of the camera taking the image, based on the difference information received from the frame calculation unit 311.

The foreground object detection unit 320 may detect an independently moving foreground object in the image. When motion of the image and motion of the camera are detected by the motion detection unit 310, the foreground object detection unit 320 may determine, in the image, outliers whose motion is not consistent with motion of the camera, to detect the foreground object. Determination of the outliers will be described later with reference to FIGS. 7A, 8A, and 8B.

The foreground object detection unit 320 may include, for example, a feature point extraction unit 321, a motion calculation unit 322, and an outlier detection and determination unit 323. The feature point extraction unit 321 may extract feature points from the image signal. The motion calculation unit 322 may calculate motion of the camera received from the camera motion detection unit 313 based on the feature points received from the feature point extraction unit 321. The outlier detection and determination unit 323 may receive the calculated motion of the camera from the motion calculation unit 322 and detect outliers whose motion is not consistent with the calculated motion of the camera.

The outlier detection and determination unit 323 may determine whether the number of detected outliers is greater than a predetermined number, which can be arbitrarily set in consideration of the effect and processing speed of moving image segmentation.

The depth detection unit 330 may detect a peak value of a depth distribution based on the depth of the image. The depth detection unit 330 may detect a depth when the number of outliers detected by the foreground object detection unit 320 is less than a predetermined number. Detection of the depth of the image will be described in more detail with reference to FIGS. 9A and 9B. The principle of image analysis using depth estimation is based on the fact that since pixels in a foreground region are close to a camera and pixels in a background region are distant from the camera, the foreground region and the background region can be easily segmented from each other by calculating the depths of the pixels.

The depth detection unit 330 may include, for example, a depth estimation unit 331, a depth distribution analysis unit 332, and a peak value determination unit 333. The depth estimation unit 331 may estimate the depth of the image. The depth distribution analysis unit 332 may analyze the distribution of the depth of the image. The peak value determination unit 333 may determine whether there is at least one peak value in the depth distribution.

Although not illustrated in FIG. 3, a scene change detection unit may detect a scene change in the image, e.g., based on a color change in the image. If the detected color change is higher than a predetermined level, image analysis with respect to the current image signal may be stopped and image analysis with respect to the next image signal may be performed. In addition to detection of a change in color, detection of various other features may be used.

Figure 4:
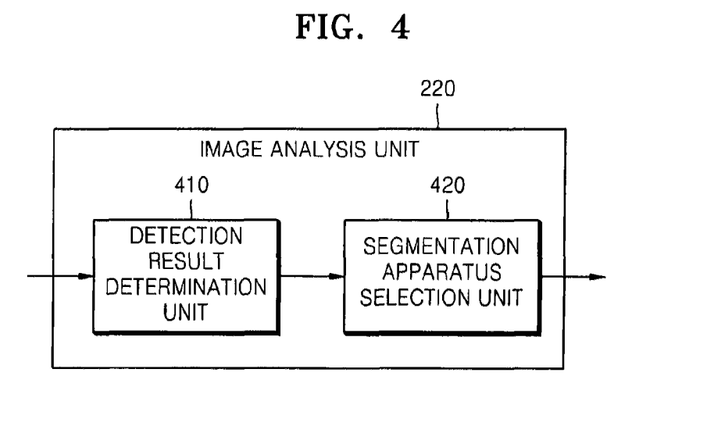
FIG. 4 illustrates an image analysis unit illustrated in FIG. 2, according to an embodiment of the present invention.

FIG. 4 illustrates an image analysis unit 220, such as illustrated in FIG. 2. Referring to FIG. 4, the image analysis unit 220 may include, for example, a detection result determination unit 410 and a segmentation apparatus selection unit 420.

The detection result determination unit 410 may be provided with image feature information, e.g., whether the image has motion, whether the camera taking the image moves, whether an object moving independently exists in the image, and whether the number of peak values in the depth distribution of each of the camera and the image is greater than one. The image feature information may be provided by, for example, the motion detection unit 310, the foreground object detection unit 320, and the depth detection unit 330 of the feature detection unit 210 illustrated in FIG. 3, in order to determine the features of the image based on the image feature information.

The image segmentation apparatus selection unit 420 may generate an image analysis signal suitable for an image mode based on mode information provided from the detection result determination unit 410 and may select a segmentation apparatus 120 according to the image analysis signal. The segmentation apparatus 120 is an apparatus capable of implementing a method described above according to an image mode, e.g., an apparatus capable of performing a still image segmentation method, a background subtraction method, a depth estimation method, or a segmentation method using 3D motion.

Figure 5:
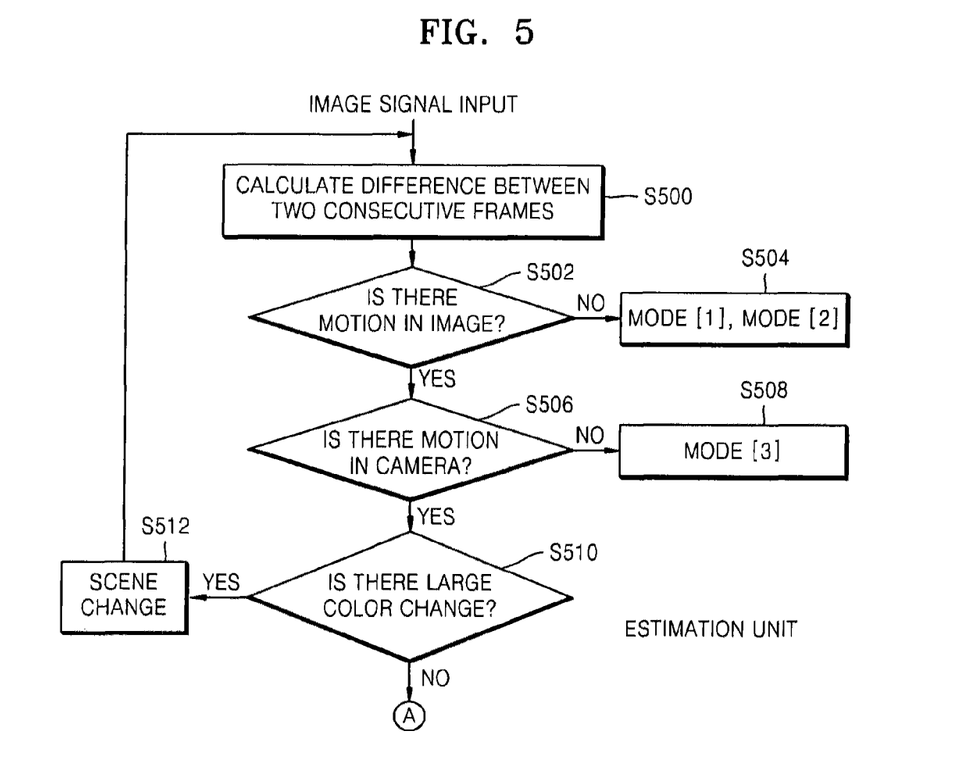
FIG. 5 illustrates an image analysis method according to an embodiment of the present invention.

FIG. 5 illustrates an image analysis method according to another embodiment of the present invention.

An image, such as a TV broadcasting image, a personal content image, or a stored media play image, taken by an image input apparatus, e.g., a moving image recording device such as a video camera, a digital camera, or a camera phone, may be input. The image may be an analog image or a digital image, but it is assumed for the current embodiment that the input image is a digital image signal. Image sequences converted into a digital image signal may be sequentially input to an image mode classification apparatus, according to an embodiment of the present invention.

Referring to FIG. 5, in operation 500, an image analysis apparatus may receive an image signal from the image input apparatus and calculate a difference between consecutive frames of the image signal. Generally, motion of an object in a moving image may be accompanied by a change between two consecutive frames. Thus, by observing a change between frames, motion of the image may be detected. However, a difference image between two frames may include not only a change occurring due to motion of an object but also a change occurring due to other causes. Therefore, to detect a region in an actual image in which motion of an object occurs, frame difference analysis may be required. In the frame difference analysis, a brightness difference between two consecutive frames is obtained and a region having a brightness difference that is greater than a threshold may be classified as having motion. The threshold may be adaptive to an image state or environment.

In operation 502, it may be determined whether there is motion in the image by calculating an image difference between consecutive frames using the method described above. To this end, it may be determined whether a camera moves and whether there is motion in a foreground region and a background region, i.e., whether there is motion of a frame of the image. If it is determined that there is no motion in the image signal, the image signal may be analyzed as mode [1] or mode [2]. In an embodiment of the present invention, it may not be necessary to distinguish mode [1] and mode [2] from each other. This is because neither mode [1], in which a camera is in a still state and there is no foreground object, nor mode [2], in which a camera is in a still state and a foreground object is in a still state, may require segmentation into a foreground region and a background region.

In operation 506, if there is motion in the image, it may be determined whether a camera taking the image moves. If the camera moves, almost all pixels in the image may move. However, if the camera does not move, most of the pixels in a background of the image may not move. In addition, without loss of generality, it may be assumed that a background is in a still state and a case where a background moves may be interpreted as a case where the background is in a still state and a camera moves. Thus, if the camera does not move, there may be little difference between two consecutive frames in terms of pixels in the background of the image. More specifically, a difference between two consecutive frames may be measured as a result of dividing a sum of square differences between color or gray level intensities of the two consecutive frames by the number of pixels, for example. Alternatively, in two consecutive frames in which differences between color or gray level intensities of the pixels are greater than a threshold, if a rate of the number of pixels is higher than a predetermined level, it may be determined that a camera moves. If the camera does not move, the image signal may be analyzed as mode [3], in which the camera is in a still state and there is an independently moving foreground object. In this way, mode [1], mode [2], and mode [3] may be determined based on a difference between consecutive frames.

If the image is analyzed as mode [1] or mode [2], it may be a still image and in this case, a well-known still image segmentation method may be used. For an image analyzed as mode [3], a background subtraction method may be used. By using the background subtraction method, only an independently moving object region may be easily extracted as a foreground region of the current frame without detecting a background having little change.

In operation 510, if it is determined that the camera moves, it may be detected whether there is a large color change in the image. This is because a change in a large number of pixel values may occur when the camera moves or a scene change occurs. A scene change may be indicated by a non-continuous change of contents in the image, in which almost all pixels of the image take new pixel values and a color distribution of the image is also changed. In an embodiment of the present invention, a scene change may be detected by comparing feature values, e.g., color histograms, of consecutive frames with each other. Alternatively, the scene change may also be detected by dividing the image into blocks and comparing the blocks with each other. In operation 512, if a large color change occurs in the image, it may be determined that a scene change occurs. A new image may be analyzed and segmented starting from the point of the scene change. In other words, if a scene change occurs, a process may go back to a pre-process of operation 500 to discard a frame of the previous image signal, read the next frames, and perform image analysis and segmentation with respect to a new scene.

Figure 6:
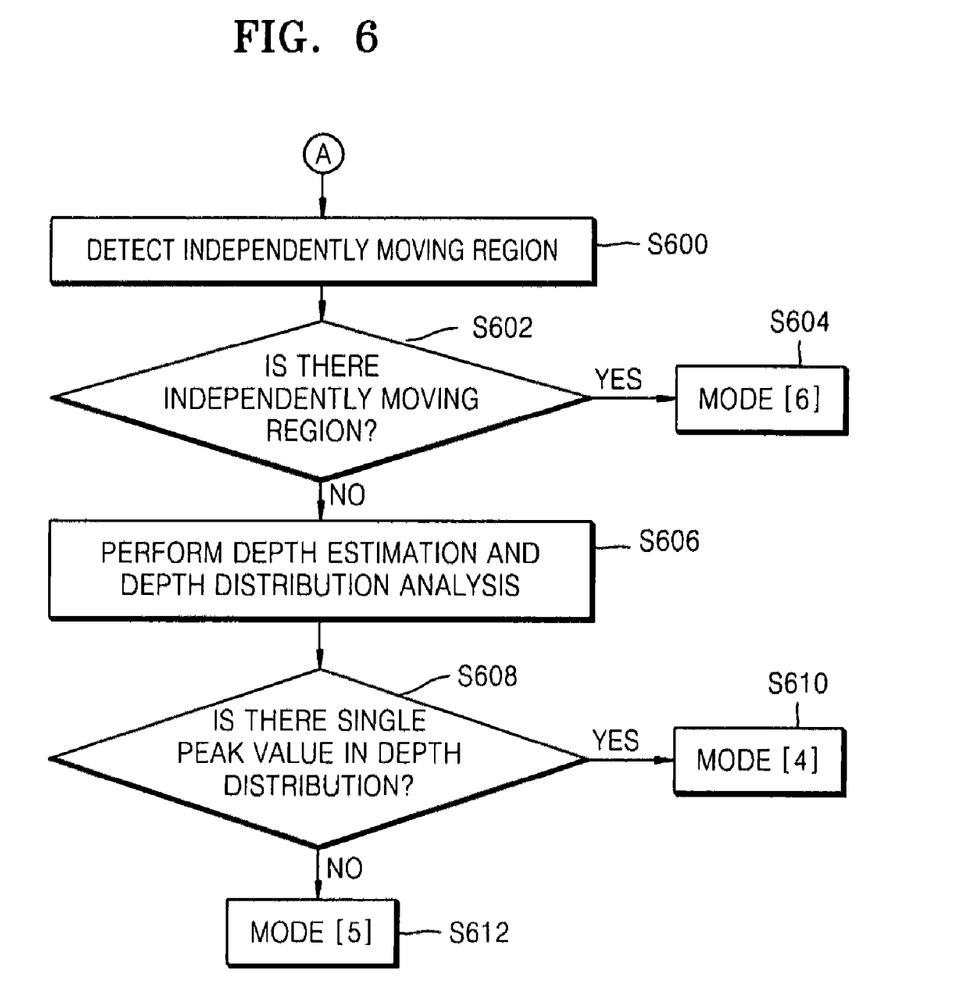
FIG. 6 illustrates an image analysis method according to an embodiment of the present invention.

FIG. 6 illustrates an image analysis method according to another embodiment of the present invention.

Referring to FIG. 6, in the case of A illustrated in FIG. 5, e.g., if it is determined that a large color change does not occur in the image, an independently moving region may be detected in operation 600. In operation 602, it may be determined whether an independently moving region exists. If an independently moving region, e.g., a foreground object, exists, the image may be analyzed as mode [6]. In this case, it may be necessary to determine whether there is an independently moving object in an image taken by a moving camera. Such a determination process will be described with reference to FIGS. 7, 8A, and 8B.

Figure 8A:
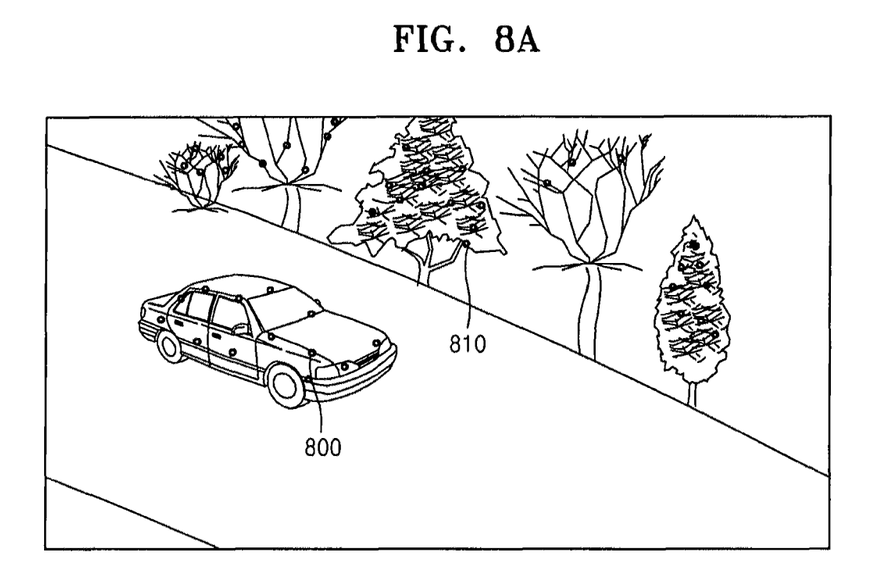
FIGS. 8A and 8B explain tracking of feature points and detection of outliers, according to an embodiment of the present invention.
Figure 8B:
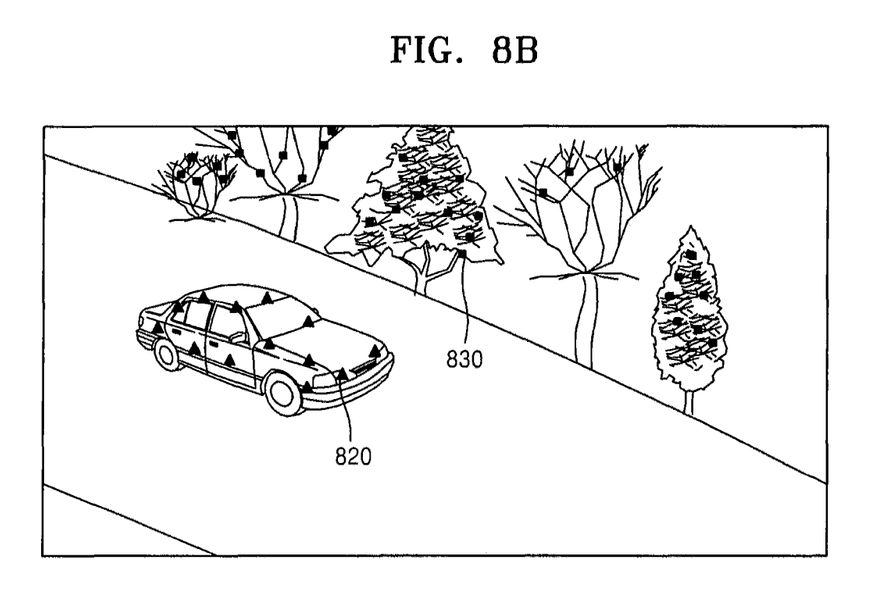

Feature points in an image may be tracked to determine whether there is an independently moving object. FIGS. 8A and 8B show examples of a feature point tracking scene. First, in FIG. 8A, for example, there is a moving car and trees exist in a background. The foreground region includes the car and the background region includes the trees. Feature points 800 of the car and feature points 810 of the trees are marked with circles.

In FIG. 8B, a moving car is an object that may move independently of a background, and feature points 820 of the independently moving object may move in such a manner that they are not consistent with the motion of a camera. In FIG. 8B, the feature points 820 are marked with triangles. However, feature points 830 of the background, which are marked with squares, may be inliers that follow the motion of the camera. Thus, whether an independently moving object exists or not may be determined by the number of outliers 820 that are not consistent with the motion of the camera, e.g., triangle points in FIG. 8B.

Figure 7:
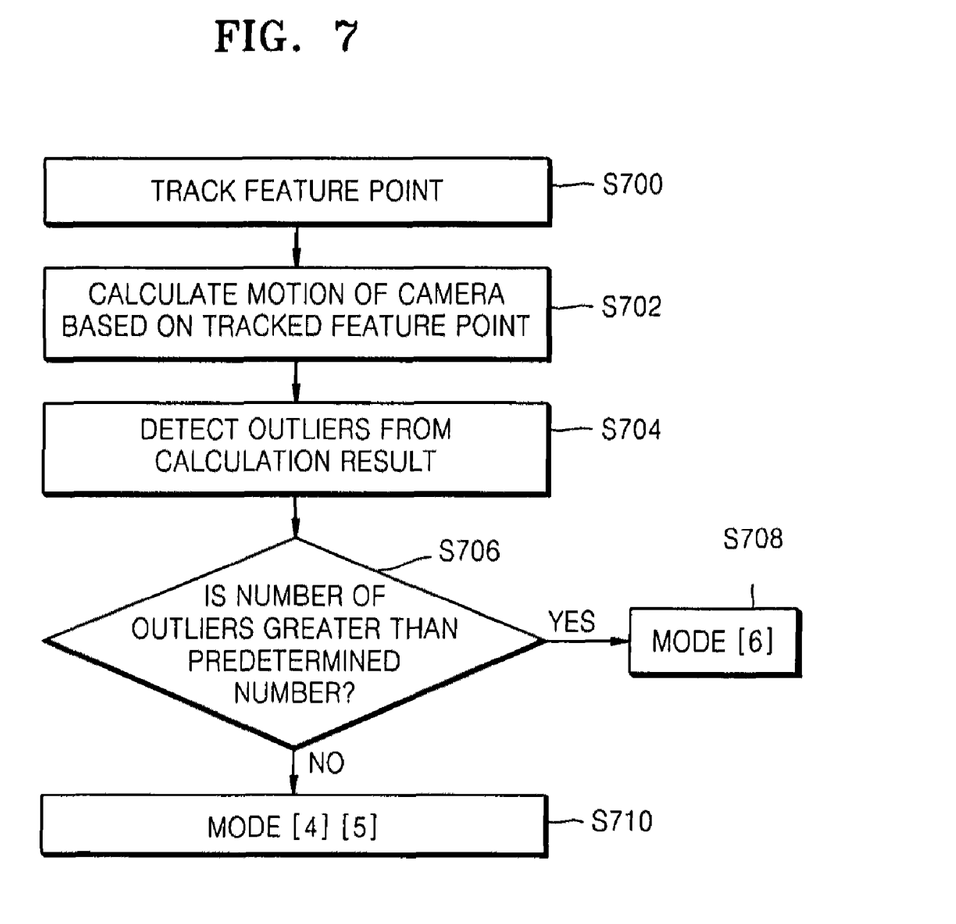
FIG. 7 illustrates an image analysis method according to an embodiment of the present invention.

FIG. 7 illustrates an image analysis method, according to another embodiment of the present invention. The image analysis method illustrated in FIG. 7 may detect an independently moving foreground object in an image based on detection of inliers and outliers, as illustrated for example in FIGS. 8A and 8B. Since detection of outliers for mode classification may be applied to foreground segmentation, i.e., segmentation performed after image analysis, the additional time required for image analysis and classification may not significantly increase the overall processing time for segmentation.

Feature points of an image may be tracked in operation 700 and motion of a camera may be calculated from the tracked feature points in operation 702. In operation 704, outliers may be detected from the calculation result. Feature points consistent with the motion of the camera, e.g., feature points of a background, may satisfy Equation 1. Here, if a feature point x of a frame 1 corresponds to a feature point x' of a frame 2, Equation 1 is as follows:

$$x^T F x' = 0 \qquad \text{Equation 1}$$

where F may be a 3×3 matrix indicating a relationship between two frames and is a fundamental matrix. If x and x' are outliers, they may not satisfy Equation 1 and in this case, x and x' may deviate from their epipolar lines. The extent to which x and x' deviate from their epipolar lines may be measured as follows:

$$d(x, Fx')^2 + d(x', F^T x)^2 = (x^T F x')^2 \left( \frac{1}{(Fx')_1^2 + (Fx')_2^2} + \frac{1}{(F^T x')_1^2 + (F^T x^1)_2^2} \right) \qquad \text{Equation 2}$$

Where $(Fx')_1$ and $(Fx')_2$ are a first component and a second component of each vector. If the result of Equation 2 is greater than a change of a feature point tracking error, it may be determined as an outlier. Optionally, outliers may also be tracked using a measurement method that is geometrically meaningful like Sampson distance, for example.

In operations 706 and 708, if the number of outliers is greater than a predetermined number, a corresponding image may be analyzed as mode [6]. The predetermined number may be arbitrarily set in consideration of the effect and processing speed of segmentation. Feature points may be segmented into those included in a foreground region and those included in a background region from the feature point segmentation result. More specifically, a candidate for the foreground region and a candidate for the background region may be generated based on the feature point segmentation result, and segmentation may be performed using features in the candidates. Features that may be used for segmentation include color, 2D motion, and image gradient, e.g., a temporary change rate of a gray level intensity and a spatial change rate, or a combination thereof or some strong features thereof.

In operation 706, if the number of outliers is less than a predetermined number, the process may proceed to operation 710. A case where the image is analyzed as mode [4] or mode [5] will be described with reference to FIG. 6. In operation 606, depth estimation and depth distribution analysis may be performed on the image. Here, the depth of a pixel in the image may indicate a distance between the pixel and the camera and depth information may play an important role in segmentation. In particular, since pixels included in a foreground region are close to the camera and pixels included in a background region are distant from the camera, segmentation may be performed using the depth information.

A depth-based segmentation method may be used for image analysis, in an embodiment of the present invention. In other words, the depth of each pixel in the image may be estimated and the distribution of the depths may be expressed with respect to a distance d as illustrated in FIGS. 9A and 9B.

Figure 9A:
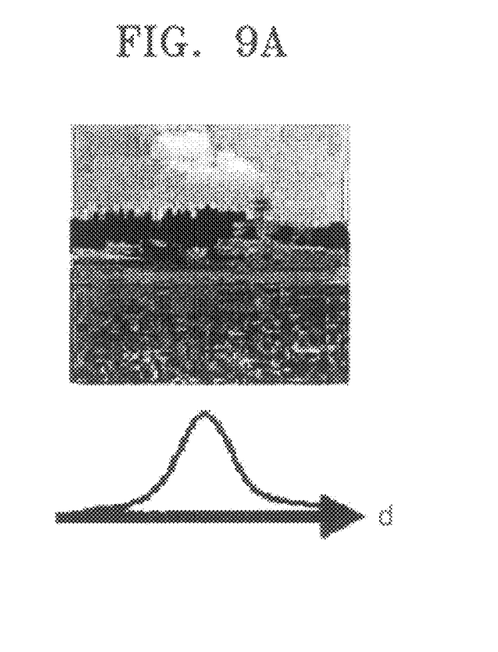
FIGS. 9A and 9B explain detection of a peak value based on depth estimation, according to an embodiment of the present invention.
Figure 9B:
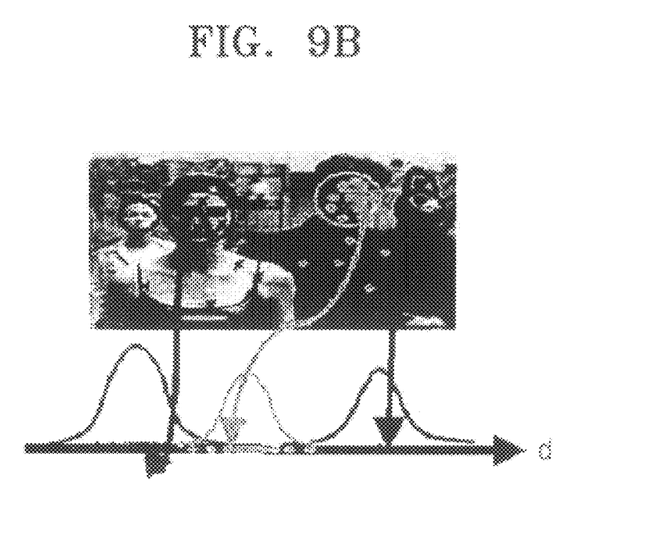

FIG. 9A illustrates an image in which only a background exists. The depth distribution of the image has one peak value. In contrast, as illustrated in FIG. 9B, the depth distribution of an image having many foreground objects, e.g., key persons, may have several peak values.

In operation 608, it may be determined whether a depth distribution has a single peak value. Referring to FIG. 9A, a depth distribution may take the form of a single curve according to a depth. An image taking the form of a single curve may be classified as a mode having no foreground object, i.e., mode [4]. If at least two peak values exist as illustrated in FIG. 9B, an image may be determined to have a foreground object, i.e., persons' faces in FIG. 9B, and may be classified as mode [5].

More specifically, a depth may be estimated using extraction of a 3D structure from motion of the camera. If the distribution of the estimated depths has multiple peak values, i.e., is multi-modal, a corresponding image may be classified as mode [5]. If the distribution of the estimated depths has a single peak value, i.e., is uni-modal, the image may be classified as mode [4]. To determine whether a data distribution is uni-modal or not, a method such as a DIP test or kernel density estimation may be used.

If the image is classified as mode [4], there may be no foreground object in the image and thus segmentation may not be required. If the image is classified as mode [5], a region whose depth is less than a threshold may be segmented as a foreground region and a region whose depth is greater than the threshold may be segmented as a background region according to the depth distribution. In this case, since calculation for depth estimation performed for image analysis may facilitate segmentation, the additional time required for image analysis according to an embodiment of the present invention may be insignificant.

By using mode classification, according to an embodiment of the present invention, an appropriate segmentation method may be used according to the mode classification result. Therefore, a greater number of scenes may be segmented than when a single segmentation method is used without mode classification. More specifically, a segmentation method using 3D motion may be used only when a foreground object moves independently, as in mode [3] and mode [6], and need not be used for mode [1], mode [2], mode [4], and mode [5]. However, since a segmentation method using depth estimation may also be used in mode [4] and mode [5], a mode in which segmentation may be performed may be expanded to mode [3], mode [4], mode [5], and mode [6]. Mode [1] and mode [4] may not require segmentation, mode [2] may use a still image segmentation method, and mode [3] may use a fast and simple background subtraction method.

In brief, since the performances of segmentation methods may differ according to the features of an image, an optimal segmentation method may be selected based on the feature of the image, thereby improving the speed and performance of segmentation.

The scope of the present invention may also include an embodiment in which it may be determined whether an independently moving object exists and then whether a camera moves, without being limited to the foregoing embodiments of the present invention. Alternatively, it may be determined whether or not a camera moves, and different segmentation methods may be used depending on whether or not the camera moves. Alternatively, it may be determined whether or not an independently moving object exists, and different segmentation methods may be used depending on whether or not an independently moving object exists.

In addition to the above described embodiments, embodiments of the present invention may also be implemented through computer readable code/instructions in/on a medium, e.g., a computer readable medium, to control at least one processing element to implement any above described embodiment. The medium can correspond to any medium/media permitting the storing of the computer readable code.

The computer readable code may be recorded on a medium in a variety of ways, with examples of the medium including recording media, such as magnetic storage media (e.g., ROM, floppy disks, hard disks, etc.) and optical recording media (e.g., CD-ROMs, or DVDs). The media may also be a distributed network, so that the computer readable code is stored and executed in a distributed fashion. Still further, as only an example, the processing element could include a processor or a computer processor, and processing elements may be distributed and/or included in a single device.

By detecting the features of an image and performing segmentation of an image signal according to the detected features of the image according to one or more embodiments of the present invention, segmentation may be performed effectively on various types of moving images and the performance of a system for application processing such as display quality processing, moving image coding, and object recognition may be improved using the segmentation result.

Moreover, since most of the computation results required for image feature analysis can be reused for image segmentation process, a problem of a speed delay resulting from additional processing may be insignificant. Furthermore, calculation used in image feature analysis may facilitate segmentation in each image mode. In addition, by adding a structure for image analysis to a moving image segmentation system, both the performance and speed of the entire algorithm may be improved.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An image analysis method for an image signal representing an image, the method comprising:
  detecting a feature of the image, wherein the feature of the image includes a motion of a device taking the image;
  determining a segmentation algorithm based on the detected feature of the image; and
  segmenting, using one or more processors, the image signal using the determined segmentation algorithm.

2. The image analysis method of claim 1, wherein the feature of the image further includes at least one of a motion of the image, and whether a foreground object that moves independently in the image exists.

3. The image analysis method of claim 1, further comprising receiving an image signal representing an image, and wherein the detecting comprises:
  calculating a difference between a current frame of the image signal and a previous frame of the image signal;
  detecting motion of the image based on the calculation result; and
  detecting motion of the device taking the image based on the detected motion of the image.

4. The image analysis method of claim 3, further comprising detecting a foreground object that moves independently in the image based on the detected motion of the device taking the image, wherein the detection of the foreground object is performed by determining a quantity of outliers whose motion is not consistent with the motion of the device.

5. The image analysis method of claim 4, further comprising detecting a peak value of a depth distribution by analyzing the depth distribution of the image based on a detection result of the detecting of the foreground object, wherein if the number of outliers is less than a predetermined number, the detecting of the peak value of the depth distribution is performed.

6. The image analysis method of claim 4, further comprising determining whether a number of peak values is greater than 2.

7. The image analysis method of claim 4, wherein the detecting of the foreground object comprises:
  tracking feature points in the image;
  calculating motion of the device taking the image from the tracked feature points;
  detecting, among the feature points, outliers whose motion is not consistent with the calculated motion of the device taking the image; and
  determining whether a quantity of the detected outliers is greater than a predetermined number.

8. The image analysis method of claim 5, wherein the detecting of the peak value of the depth distribution comprises:
    estimating depths of the image signal;
    analyzing a distribution of the estimated depths; and
    determining a quantity of peak values of the analyzed depth distribution.

9. The image analysis method of claim 1, further comprising detecting a color change in the image, wherein image analysis with respect to a current image signal is stopped and image analysis with respect to a next image signal is performed upon the detected color change being higher than a predetermined level.

10. At least one non-transitory medium comprising computer readable code to control at least one processing element to implement the method of claim 1.

11. An image analysis apparatus for an image signal representing an image, the apparatus comprising:
    a feature detection unit to detect a feature of the image, wherein the feature of the image includes a motion of a device taking the image;
    an image analysis unit to determine a segmentation algorithm based on the detected feature of the image; and
    an image segmentation unit to segment, using one or more processors, the image signal using the segmentation algorithm determined by the image analysis unit.

12. The image analysis apparatus of claim 11, wherein the image segmentation unit segments the image signal into a foreground region and a background region using the segmentation algorithm.

13. The image analysis apparatus of claim 11, wherein the feature detection unit comprises:
    a motion detection unit to detect a motion of the image and the motion of the device taking the image; and
    a foreground object detection unit to detect a foreground object that moves independently in the image,
    wherein the foreground object detection unit determines a quantity of outliers of the image whose motion is not consistent with the motion of the device taking the image, and detects the foreground object based on the quantity of outliers, upon the motion of the image and the motion of the device taking the image being detected by the motion detection unit.

14. The image analysis apparatus of claim 13, wherein the feature detection unit further comprises a depth detection unit to detect a peak value of a depth distribution based on depths of the image, wherein the depth detection unit detects the depths of the image signal upon the quantity of outliers detected by the foreground object detection unit being less than a predetermined number.

15. The image analysis apparatus of claim 14, wherein the depth detection unit comprises:
    a depth estimation unit to estimate the depths of the image signal;
    a depth analysis unit to analyze a distribution of the estimated depths of the image signal; and
    a peak value determination unit to determine whether a quantity of peak values of the depth distribution is greater than 1.

16. The image analysis apparatus of claim 12, wherein the motion detection unit comprises:
    a frame calculation unit to receive the image signal and calculate a difference between a current frame of the image signal and a previous frame of the image signal;
    an image motion detection unit to detect motion of the image based on the difference received from the frame calculation unit; and
    a motion calculation unit to calculate motion of the device taking the image based on a difference received from the frame calculation unit,
    wherein if the motion of the image is detected by the image motion detection unit, the motion calculation unit calculates the motion of the device taking the image.

17. The image analysis apparatus of claim 12, wherein the foreground object detection unit comprises:
    a feature point extraction unit to extract feature points from the image signal;
    a motion calculation unit to calculate the motion of the device taking the image, detected by the motion detection unit, based on the feature points received from the feature point extraction unit; and
    an outlier detection and determination unit to detect a quantity of outliers whose motion is not consistent with the calculated motion of the device taking the image and to determine the quantity of outliers,
    wherein the outlier detection and determination unit determines whether the number of outliers is greater than a predetermined number.

18. The image analysis apparatus of claim 12, wherein the image analysis unit comprises:
    a detection result determination unit to determine the feature of the image based on at least one of the motion of the image and the motion of the device taking the image detected by the motion detection unit, the foreground object received from the foreground object detection unit, and the peak value received from the depth detection unit; and
    wherein the image segmentation unit includes an image segmentation apparatus selection unit to receive the determination result of the detection result determination unit and to select a segmentation apparatus based on the determination result.

19. The image analysis apparatus of claim 13, wherein the feature detection unit comprises a scene change detection unit to detect a scene change in the image based on a color change in the image, wherein the scene change detection unit stops image mode classification for a current image signal and performs image mode classification for a next image signal upon the detected color change being higher than a predetermined level.

20. A moving image segmentation system to segment an image signal received from the image signal input apparatus into a foreground region and a background region, the system comprising:
    an image signal input device; and
    an image analysis apparatus of claim 11.

* * * * *

UNITED STATES PATENT AND TRADEMARK OFFICE
CERTIFICATE OF CORRECTION

PATENT NO. : 8,285,045 B2
APPLICATION NO. : 11/898780
DATED : October 9, 2012
INVENTOR(S) : Jun-mo Kim et al.

Page 1 of 1

It is certified that error appears in the above-identified patent and that said Letters Patent is hereby corrected as shown below:

In the Claims

Line 1, Column 14, In Claim 16, delete "claim 12" and insert -- claim 13 --, therefor.

Line 15, Column 14, In Claim 17, delete "claim 12" and insert -- claim 13 --, therefor.

Line 30, Column 14, In Claim 18, delete "claim 12" and insert -- claim 13 --, therefor.

Signed and Sealed this
Twenty-second Day of October, 2013

Teresa Stanek Rea
*Deputy Director of the United States Patent and Trademark Office*